Nov. 19, 1940.  P. G. AUSTIN  2,222,163
ADJUSTABLE GARDEN RAKE
Filed March 14, 1938  2 Sheets-Sheet 1
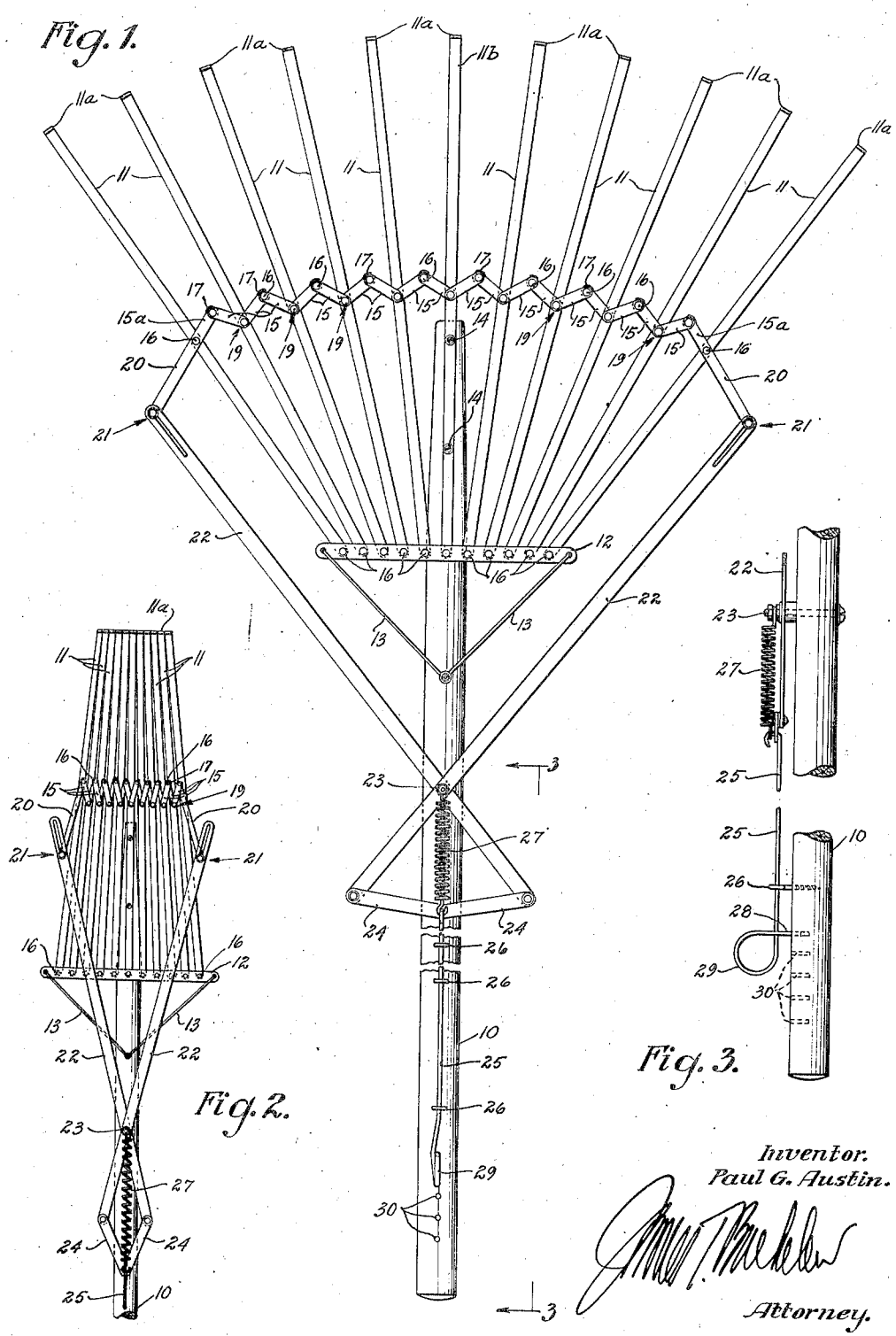
Fig.1.
Fig.2.
Fig.3.
Inventor.
Paul G. Austin.
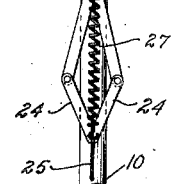
Attorney.

Nov. 19, 1940.                P. G. AUSTIN                2,222,163
                        ADJUSTABLE GARDEN RAKE
                        Filed March 14, 1938            2 Sheets-Sheet 2
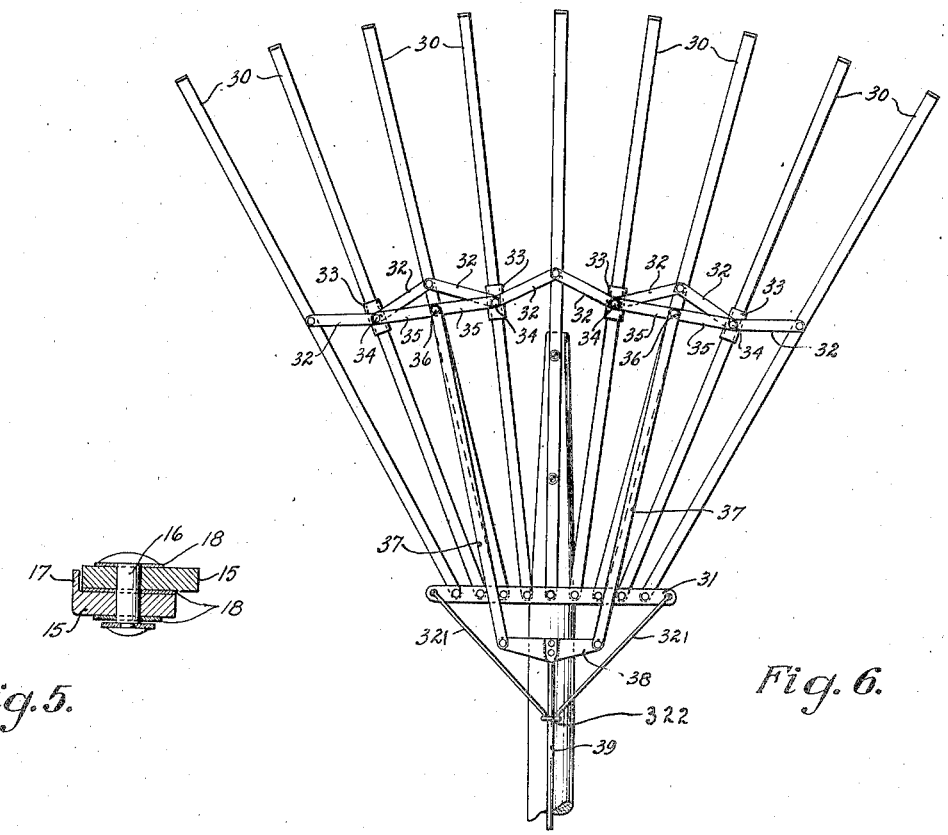
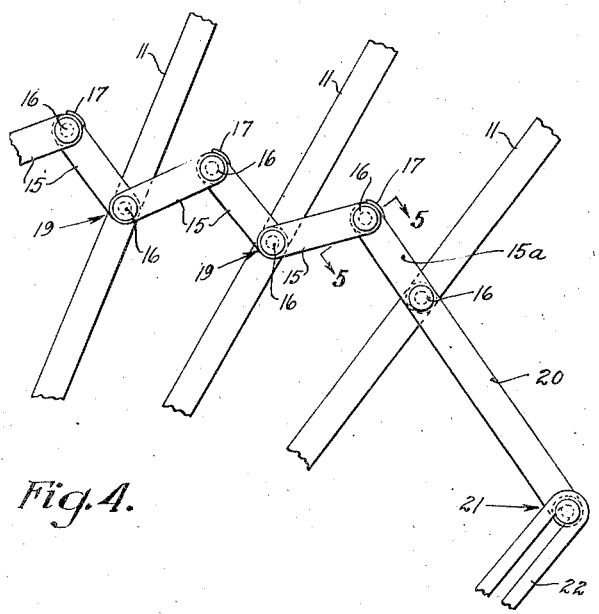
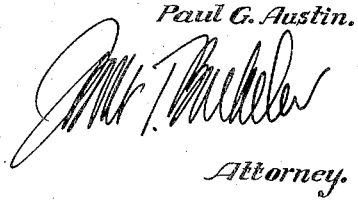

Patented Nov. 19, 1940

2,222,163

UNITED STATES PATENT OFFICE 2,222,163

ADJUSTABLE GARDEN RAKE

Paul G. Austin, Pasadena, Calif.

Application March 14, 1938, Serial No. 195,763

9 Claims. (Cl. 56—400.18)

This invention has to do generally with improvements in adjustable garden rakes, particularly of the form comprising elongated teeth extending forwardly of the rake handle and in substantially fan-shaped arrangement.

One of my principal objects is to provide means for adjustably varying the relative positions of the teeth within a range of from closed or converged position in which the ends of the teeth are brought together with substantially no spacing between them, to spread positions in which the teeth may have any desired spacing. Another important feature of the invention is the provision of a teeth adjusting mechanism that has the advantage over prior adjustments of being smoother and more positive in its action, and capable of remaining so during continued use of the rake.

In the preferred forms of the invention, the rake teeth are interconnected by links associated with an adjustable actuating mechanism by means of which force is applied directly to the links to spread or converge, i. e. contract, the teeth. Relative movement of the parts during adjustment of the teeth may be pivotal throughout, thus assuring smooth and positive action. Preferably I associate with the adjusting mechanism a spring tending to spread the teeth when the control rod is released from a position at which the teeth are converged, thus facilitating adjustment of the teeth and preventing, by virtue of the constantly applied spring force, looseness between the parts at all positions of the teeth.

The above mentioned features of the invention as well as additional aspects and objects thereof will be understood to better advantage from the following detailed description of the invention in certain typical and illustrative forms. Throughout the description reference is had to the accompanying drawings, in which:

Fig. 1 is a bottom view illustrating one form of the invention with the rake teeth in spread positions;

Fig. 2 is a similar view showing the teeth in converged positions;

Fig. 3 is a fragmentary elevation on line 3—3 of Fig. 1;

Fig. 4 is an enlarged fragmentary view showing the toggle link connections between the teeth;

Fig. 5 is an enlarged section on line 5—5 of Fig. 4; and

Fig. 6 is a view illustrating a variational form of the invention.

Referring first to Fig. 1, the rake comprises a handle 10 carrying at its forward end a plurality of elongated teeth 11 having downwardly turned ends 11a, and assuming in their spread positions a substantially fan-shaped arrangement, as illustrated. At their inner ends the teeth 11 are pivotally attached to a cross bar 12 mounted on the handle 10 and supported by braces 13. The center tooth 11b is rigidly fixed at 14 to the forward end of the handle projecting beyond the cross bar 12. Successive teeth are interconnected by toggle links 15, one of which carries at the link pivot 16 a stop 17 which limits the spread of both the toggle and the connected teeth 11. As shown in Fig. 5, brass washers 18 preferably are placed between the links and also between the rivet heads of the links in order to assure free pivotal movement between the parts. Washers similarly are placed between the relatively pivotally movable parts in the connections 19 of the toggle links with the teeth.

The teeth are adjustably movable between the fully spread positions of Fig. 1 and the contracted positions shown in Fig. 2, by the application of force directly to the interconnecting links. In the form of the invention shown in Fig. 1, the end links 15a have integral extensions 20 attached by pin and slot connections at 21 with a pair of angularly movable levers 22 pivotally movable about pin 23 carried by the handle at the intersection of the levers. The inner ends of levers 22 are connected by links 24 with a rod or wire 25 extending longitudinally of the handle within suitable guides 26. A coil spring 27 interconnecting pin 23 and the end of rod 25, tends to spread the levers 22 and the rake teeth 11 to their limiting spread positions determined by the toggle stops 17. The teeth are converged or contracted by pulling rod 25 against the resistance of spring 27, and the teeth may be maintained in fully closed positions, see Fig. 2, or at predetermined intermediate degrees of convergence, by thrusting the inwardly projecting end 28 of the handle at its looped end 29, into recesses or holes 30 drilled in the handle at longitudinally spaced points. Rod 25 is sufficiently flexible and capable of rotation within the guides 26, to permit the end portion 28 to be withdrawn from openings 30 and swung to one side of the handle to permit longitudinal movement of the rod within the range of adjustment of the teeth.

The link connections between the teeth and their attachment with rod 25 provide a particularly advantageous means for adjustably varying the spread of the teeth, in that binding cannot occur between the connected link parts, and the mechanism as a whole is smooth and positive in its operation. Also, by positioning and connecting the control rod 25 with the link mechanism as described, a simple and conveniently operable means is provided whereby one using the rake may quickly and easily adjust the spread of the teeth by a simple manipulation of the rod.

In Fig. 6 I show a variational form of the invention in which the rake teeth are interconnected by a series of links attached intermediate the ends of the series to the handle carried actuating rod. Here the teeth 30, pivotally mounted on a cross bar 31 as in the first described form, are interconnected by single links 32, alternate teeth carrying slide members 33 movable longitudinally on the teeth to permit relative pivotal movement of the links that will permit the teeth to be converged to fully contracted positions corresponding to Fig. 2. Bar 31 is braced to the handle by members 321 having at their convergent ends a guide 322 through which rod 39 extends. The link pivot pins 34 carried by the slide members 33 are interconnected by links 35 pivotally connected by pins 36 to which rods 37 are attached. The inner ends of rods 37 are pivotally connected with a head 38 on the end of rod 39 corresponding to rod 25 in Fig. 1. As will be apparent, by longitudinally adjusting rod 39, its movement is transmitted by rods 37 and links 35 to the slide members 33, causing the latter to spread or converge links 32 and the teeth connected therewith, in accordance with the direction of movement of rod 39.

In both the described forms of the invention, the teeth may be converged to positions parallel with the handle and inwardly beyond such positions, depending upon the spacing of the pivotal connections with member 12, thus bringing the ends of the teeth in side by side relationship. The teeth thus are given capacity for spread adjustment from a fully converged condition in which there is substantially no spacing between the ends of the teeth, to fully open position in which the teeth may have any desired spacing or spread within the dimensional limitations of the teeth and their link connections. In other rakes of this general type, provision has been made for spread adjustment of the teeth, but it is believed that the invention marks the first instance in which it is possible to obtain the full range of individual teeth adjustment from substantially no spacing to fully spread positions. The adjustability of the teeth to converged positions in which the teeth are brought edge to edge gives the rake added utility in that it may also be used as a scraping tool, see Fig. 2, the ends 11a presenting a substantially continuous edge extending at right angles with the longitudinal axis of the rake.

It is to be understood that the drawings are merely illustrative of the invention in certain of its typical forms, and that various changes and modifications may be made without departure from the scope of the invention as expressed in the appended claims.

I claim:

1. In a rake, the combination comprising a handle, a plurality of elongated teeth extending forwardly of the handle, successive teeth being adapted to spread apart so that the teeth assume a substantially fan-shaped arrangement, links interconnecting said teeth and pivotally attached thereto, means on said links limiting their relative pivotal movement, and means for moving the spread teeth together.

2. In a rake, the combination comprising a handle, a plurality of elongated teeth extending forwardly of the handle, successive teeth being adapted to spread apart so that the teeth assume a substantially fan-shaped arrangement, pivoted links interconnecting said teeth, and a spring tending to spread said teeth apart.

3. In a rake, the combination comprising a handle, a plurality of elongated teeth extending forwardly of the handle, successive teeth being adapted to spread laterally apart so that the teeth assume a substantially fan-shaped arrangement, pivoted links interconnecting said teeth, and means including a spring for applying force directly to said links to move said teeth laterally.

4. In a rake, the combination comprising a handle, a plurality of elongated teeth extending forwardly of the handle, successive teeth being adapted to spread apart so that the teeth assume a substantially fan-shaped arrangement, pivoted toggle links interconnecting successive teeth, means limiting relative pivotal movement between said links to limit the teeth spread, and means for applying force directly to the links to spread and contract the teeth.

5. In a rake, the combination comprising a handle, a plurality of elongated teeth extending forwardly of the handle, successive teeth being adapted to spread apart so that the teeth assume a substantially fan-shaped arrangement, pivoted toggle links interconnecting successive teeth, means limiting relative pivotal movement between said links to limit the teeth spread, and means comprising a pair of lever arms pivotally mounted on the handle and terminally connected to said links, for applying force directly to the links to spread and contract the teeth.

6. In a rake, the combination comprising a handle, a plurality of elongated teeth extending forwardly of the handle, successive teeth being adapted to spread apart so that the teeth assume a substantially fan-shaped arrangement, pivoted toggle links interconnecting successive teeth, means limiting relative pivotal movement between said links to limit the teeth spread, means comprising a pair of lever arms pivotally mounted on the handle and terminally connected to said links, and yielding means applied to said arms and acting to spread the teeth.

7. In a rake, the combination comprising a handle, a plurality of elongated teeth extending forwardly of the handle, successive teeth being adapted to spread apart so that the teeth assume a substantially fan-shaped arrangement, means for mounting the inner ends of the teeth at points spaced transversely of the handle, links pivotally interconnecting the teeth at one side of the plane of the teeth, and means operable at the handle for moving the spread teeth together into positions in which the teeth converge in the same plane toward their outer ends and said ends are brought into engagement to form a substantially continuous transversely extending edge.

8. In a rake, the combination comprising a handle, a plurality of elongated teeth extending forwardly of the handle, successive teeth being adapted to spread apart so that the teeth assume a substantially fan-shaped arrangement, means for mounting the inner ends of the teeth at points spaced transversely of the handle, links pivotally interconnecting the teeth at one side of the plane of the teeth, and means operable at the handle for moving the spread teeth together to converged positions in the same plane so that the outer ends of successive teeth are brought into engagement, and said ends of the teeth form a substantially continuous edge extending at right angles with the longitudinal axis of the rake.

9. In a rake, the combination comprising a handle, a plurality of elongated teeth extending forwardly of the handle, successive teeth being adapted to spread apart so that the teeth assume a substantially fan-shaped arrangement, a transverse series of links interconnecting said teeth and pivotally attached thereto, and means for applying force to outer links of said series to move the spread teeth together into positions in which the forward ends of the teeth are brought into engagement to form a substantially continuous transversely extending edge.

PAUL G. AUSTIN.